United States Patent [19]

White

[11] Patent Number: 4,535,654
[45] Date of Patent: Aug. 20, 1985

[54] CHAIN SAW SHARPENING GUIDE

[76] Inventor: Mark E. White, 1437 W. 11th, Port Angeles, Wash. 98262

[21] Appl. No.: 550,554

[22] Filed: Nov. 10, 1983

[51] Int. Cl.³ .............................................. B23D 63/16
[52] U.S. Cl. .......................................... 76/36; 33/202
[58] Field of Search .......................... 76/25 A, 36, 74; 33/202

[56] References Cited

U.S. PATENT DOCUMENTS

| | | | |
|---|---|---|---|
| 586,508 | 7/1897 | Morrison | 76/36 |
| 684,434 | 10/1901 | Jacobs | 76/36 |
| 1,676,188 | 7/1928 | Hugus | 76/36 |
| 1,753,701 | 6/1927 | Grant | 76/36 |
| 2,543,192 | 2/1951 | Nelson | 76/36 |
| 2,627,191 | 2/1953 | Parr | 76/36 |
| 2,861,349 | 11/1958 | Olson et al. | 76/36 |
| 2,959,832 | 11/1960 | Baermann | 7/901 |
| 3,935,757 | 2/1976 | Granberg | 76/74 |
| 4,177,697 | 12/1979 | McDunn | 76/25 A |

FOREIGN PATENT DOCUMENTS 587303 11/1959 Canada .................................... 76/36

*Primary Examiner*—Roscoe V. Parker
*Attorney, Agent, or Firm*—Christensen, O'Connor, Johnson & Kindness

[57] ABSTRACT

A visual guide for sharpening chain saw teeth. Magnetic material is affixed to one leg of an elongated member having an L-shaped cross section. The magnetic material is affixed to the external portion of the leg such that when the device is magnetically attached to a chain saw blade, the other leg of the device will extend away from and parallel to the chain saw blade. Markings are formed on the upward-facing portion of the second leg indicating the correct angle for applying a circular file to the cutting edge of the chain saw tooth. Notches are formed on the device for use as a template in gauging the proper shape of the chain saw tooth being filed.

2 Claims, 4 Drawing Figures

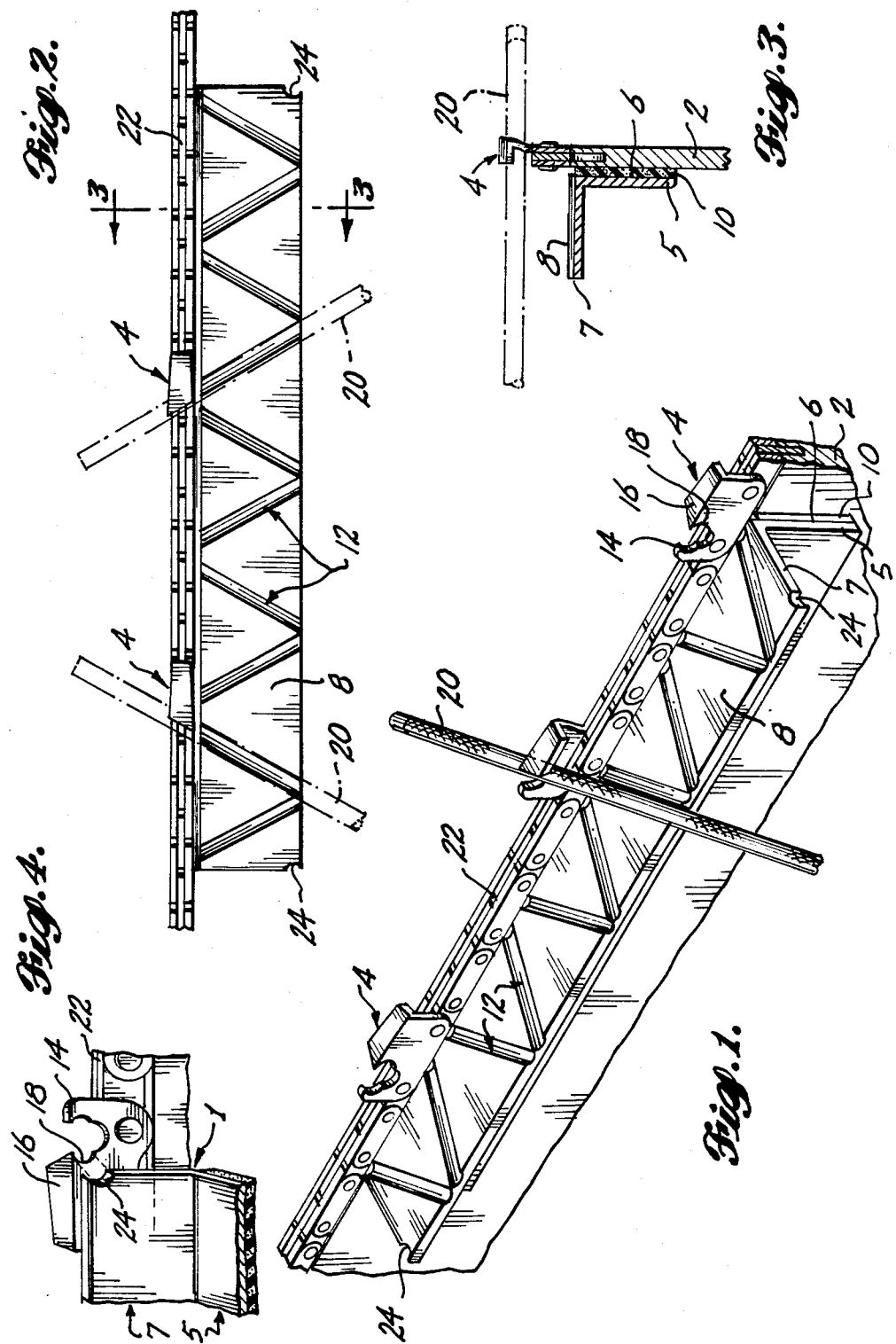

CHAIN SAW SHARPENING GUIDE

BACKGROUND OF THE INVENTION

This invention relates to chain saw blades and particularly to means for providing a visual guide for the proper positioning of a filing device for optimum sharpening of the chain saw tooth. The invention further relates to means for providing a visual guide for the proper positioning and shape of the hook which forms part of the chain saw tooth.

A chain saw blade may be of any conventional type having an elongated chain bar mounted on and protruding from a saw body. The periphery of the bar carries an endless saw chain in a peripheral groove. Several saw teeth are mounted at spaced locations around the chain. As the chain is driven around the blade, the teeth cut into and remove wood lying adjacent to the path of the moving chain. The teeth are mounted at spaced locations on alternating sides of the saw chain and extend outwardly away from the chain bar. A saw tooth consists of a leading depth post and a trailing cutting edge. The cutting edge consists of a first segment extending outwardly and parallel to the chain bar and an integrally formed second segment which extends perpendicular to the outermost edge of the first segment across the width of the chain.

The shape of the cutting edge of the tooth forms a precisely curved "hook". The curvature of the hook is fixed during manufacture to ensure most effective cutting. During normal use, the cutting edge deteriorates and it is necessary to resharpen it. Resharpening is accomplished by applying a circular file at the exact angle set by the manufacturer in order to reform the hook to its most effective cutting shape. Maintaining this angle during filing is assisted by the use of a mechanical or visual guide. Use of mechanical or visual guides in the past has required the use of mechanical clamps or other locking devices necessary for positioning the guide next to the saw blade during the filing process. In order to accomplish rapid on-site resharpening of the chain saw tooth, it is necessary for the chain saw operator to carry these clamps or locking devices to each location that the saw is used.

It is the object of this invention to provide an improved, lightweight visual guide that can quickly and easily be attached to the blade without the need for cumbersome vises or clamps. Another object of the invention is to provide, as part of such visual guide, the capability to gauge the proper shape and location of the hook on the tooth being filed.

SUMMARY OF THE INVENTION

In accordance with the foregoing objects and other objects that will become apparent to one of ordinary skill upon reading the following specification, the present invention provides a guide for sharpening chain saw teeth comprising an elongated member having two planar faces, each planar face being orthogonally disposed relative to the other. A strip of magnetic material is affixed to one of the faces which allows the guide to be magnetically positioned adjacent to the bar of the chain saw. When so positioned, the second planar face will face upward and will extend orthogonally outwardly from the chain saw bar. The upwardly facing second planar face has a plurality of indicia thereon. These indicia indicate the angle at which a filing device is to be held in order to accomplish proper sharpening of the chain saw tooth. Crescent-shaped notches are formed in the upward facing planar face. When the invention is manipulated so that these notches are juxtaposed with the cutting edge or "hook" of the chain saw tooth, the notch forms a template for gauging the proper shape of the hook.

The present invention provides a visual filing guide much less cumbersome than those presently used, allowing rapid attachment and removal from the blade without the use of bulky and time-consuming vises or clamps. Further, the guide provides an easily used gauging means for judging the extent of filing necessary.

BRIEF DESCRIPTION OF THE DRAWINGS

A better understanding of the invention can be derived by reading the ensuing specification in conjunction with the accompanying drawings wherein:

FIG. 1 is a perspective view of a file guide constructed in accordance with the invention attached to a chain saw bar, showing a circular file properly positioned relative to a saw tooth;

FIG. 2 is a top view of the file guide showing use of the visual markings on the guide to position a file for proper filing of the saw teeth, depending upon whether the saw tooth is attached to one side of the chain or the other;

FIG. 3 is a cross-sectional view of the file guide attached to a chain saw blade taken along section line 3—3;

FIG. 4 shows the use of the gauging notch also constructed in accordance with the present invention in a perspective view as it is positioned to gauge the shape of the hook of the saw tooth.

DETAILED DESCRIPTION OF THE INVENTION

FIG. 1 shows a cutaway section of the chain saw bar 2 and chain 22 with the file guide 1 constructed in accordance with the present invention in place. The periphery of the bar 2 carries an endless chain 22 upon which several saw teeth 4 are mounted. The saw teeth 4 are attached to alternate sides of the chain 22 at spaced locations around the chain. A saw tooth is comprised of two integrally formed segments, a leading depth post 14 and a trailing cutting edge 16. The depth post 14 extends outwardly on the same plane as the chain saw bar 2 and limits the depth to which the trailing cutting edge 16 can cut into the wood. The cutting edge 16 consists of a first segment extending outwardly on the same plane as the chain saw bar 2 and a second segment which extends from the end of, and perpendicular to, the first segment of the saw tooth across the width of the chain 22. When properly sharpened, the cutting edge of the saw tooth 4 will be formed to a specific curvature or "hook" 18. The shape of the hook portion of the cutting edge is set at the time of manufacturing the saw tooth to ensure the most efficient cutting.

Referring now to FIGS. 1, 2 and 3, a preferred embodiment of the invention comprises an elongated member composed of first and second flat bars 5 and 7 oriented orthogonally relative to each other and integrally joined along longitudinal edges. The bars have two planar faces 6 and 8. Thus, these planar faces are also orthogonally disposed and integrally connected at a longitudinal edge. Upon the first planar face 6 is affixed a strip of magnetic material 10. The magnetic material is permanently affixed to the first planar face 6 through the use of an appropriate bonding agent. The second planar face 8 carries a number of indicia 12. It is preferred that these indicia are permanently formed in the surface of the second planar face by scribing a U-shaped groove 12 across the surface of the second planar face 8. It is recognized that the indicia 12 may be adequately formed through other means such as decals. Since no physical loading other than gravity will be applied to the guide during use, the file guide may be constructed of lightweight material such as aluminum or plastic.

When utilized as intended, the sharpening guide 1 is attached to the chain bar 2 by positioning the magnetic strip 10 along the chain bar 2. The sharpening guide is aligned such that the second planar face 8 is parallel to the longitudinal axis of the chain saw bar 2 just below the chain 22. At this point, a circular file 20 can be applied against the hook 18 of the saw tooth 16. The person filing will then be able to take a quick glance down at the indicia 12 on the sharpening guide and align the file to be parallel with the indicium that is closest to the saw tooth to be filed. Maintaining this parallel relationship with the indicium during the filing process will ensure that the hook is resharpened to precisely the same angle of its original manufacture. It is noted that the indicia of the sharpening guide consist of two sets of parallel lines. These two sets of markings allow the file 20 to be guided for filing teeth that are attached to either side of the chain 22 without removing the guide and attaching it to the other side of the chain saw bar 2.

Crescent-shaped notches 24 are precisely formed in the transverse edges of the second flat bar 7 forming the guide. From time to time during the filing process, it is necessary to gauge the shape of the hook 18. Gauging is accomplished by detaching the guide from the chain bar by applying enough force to overcome the magnetic attraction of the magnetic strip 10, and positioning the guide so that one of the notches is placed adjacent to the hook 18 of the saw tooth 4. Positioning the guide in this manner provides a template for visually gauging the shape of the hook while it is being reformed during the filing process in order to match the originally manufactured shape represented by the notches 24.

It will be understood that various changes in the details, materials and arrangements of parts which have been herein described and illustrated in order to explain the nature of the invention may be made by those skilled in the art with the principle and scope of the invention as expressed in the appended claims.

The embodiments of the invention in which an exclusive property or privilege is claimed are defined as follows:

1. A guide for sharpening chain saw blades comprising:
    an elongated member having first and second planar faces, said planar faces being orthogonally disposed relative to each other;
    a strip of magnetic material affixed to said first face, said magnetic material allowing said guide to be magnetically positioned adjacent to the bar of the chain saw so that said second planar face extends orthogonally outwardly from said chain bar, said second planar face having a plurality of indicia thereon, said indicia being positioned on said second planar face to visually indicate the angle at which a filing device is to be held during filing of a chain saw tooth; and
    gauge means formed in the second planar face, the gauge means being positionable immediately adjacent to the cutting edge of the chain saw tooth for gauging the optimum shape of the cutting edge of the chain saw tooth.

2. A guide for sharpening the cutting edges of chain saw teeth with a file, and for gauging the curvature of the cutting edges comprising:
    an elongated L-shaped member having first and second planar faces, said planar faces being orthogonally disposed relative to each other;
    a strip of magnetic material affixed to said first planar face, said magnetic material allowing the guide to be magnetically positioned adjacent to the bar of the chain saw that said second planar face extends orthogonally outwardly from said chain bar, said second planar face having a plurality of indicia thereon, said indicia being positioned on said second planar face to visually indicate the angle at which the file is to be held during sharpening of a chain saw tooth; and
    notches formed in the second planar face at the opposing ends of the L-shaped member, said notches being shaped to duplicate the optimum curvature of the cutting edge of a chain saw tooth, said notches being positionable immediately adjacent to any cutting edge of a chain saaw tooth for gauging the shape of the cutting edge, said notches being configured and arranged so that the file does not contact the notches during sharpening of the chain saw tooth.

* * * * *